US008694192B2

(12) United States Patent
Cullinane

(10) Patent No.: US 8,694,192 B2
(45) Date of Patent: *Apr. 8, 2014

(54) CONTROL OF VEHICLES BASED ON AUDITORY SIGNALS

(71) Applicant: Google Inc., Mountain View, CA (US)

(72) Inventor: Brian Cullinane, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,835

(22) Filed: Sep. 26, 2013

(65) Prior Publication Data

US 2014/0032032 A1    Jan. 30, 2014

Related U.S. Application Data

(63) Continuation of application No. 13/442,303, filed on Apr. 9, 2012, now Pat. No. 8,571,743.

(51) Int. Cl.
*G05D 1/00*        (2006.01)

(52) U.S. Cl.
USPC .......................................................... 701/23

(58) Field of Classification Search
USPC .......................................................... 701/23
See application file for complete search history.

(56) References Cited

U.S. PATENT DOCUMENTS

| 8,031,062 | B2 | 10/2011 | Smith |
| 8,384,562 | B2 | 2/2013 | Wall et al. |
| 8,571,743 | B1 * | 10/2013 | Cullinane ...................... 701/23 |
| 2005/0286972 | A1 | 12/2005 | Gongolas |
| 2008/0162027 | A1 | 7/2008 | Murphy |
| 2011/0098932 | A1 | 4/2011 | Lapidot |
| 2011/0148660 | A1 | 6/2011 | Tate |

OTHER PUBLICATIONS

Chan, Ching-Yao et al., "Experimental Vehicle Platform for Pedestrian Detection", California PATH Research Report UCB-ITS-PRR-2006-16, Institute of Transportation Studies, University of California, Berkeley, Aug. 2006.

* cited by examiner

*Primary Examiner* — Mary Cheung
*Assistant Examiner* — Michael Berns
(74) *Attorney, Agent, or Firm* — McDonnell Boehnen Hulbert & Berghoff LLP

(57) ABSTRACT

Methods and systems for control of vehicles based on auditory signals are described. In an example, a computing device may be configured to control a vehicle or may be in communication with the vehicle. The computing device may be configured to receive audio information relating to an audible crosswalk signal for an intersection. The computing device also may be configured to determine a likelihood associated with a presence of a pedestrian in a crosswalk at the intersection based on the audio information. The computing device further may be configured to determine a control strategy associated with a driving behavior of the vehicle from among multiple control strategies, based on the likelihood, and may be configured to provide instructions to control the vehicle based on the determined control strategy.

20 Claims, 7 Drawing Sheets

COMPUTER PROGRAM PRODUCT 500

SIGNAL BEARING MEDIUM 501

PROGRAM INSTRUCTIONS 502

- RECEIVING, AT A COMPUTING DEVICE THAT IS IN COMMUNICATION WITH AN VEHICLE, AUDIO INFORMATION RELATING TO AN AUDIBLE CROSSWALK SIGNAL FOR AN INTERSECTION

- DETERMINING A LIKELIHOOD ASSOCIATED WITH A PRESENCE OF A PEDESTRIAN IN A CROSSWALK OF THE INTERSECTION, BASED ON THE AUDIO INFORMATION

- DETERMINING A CONTROL STRATEGY ASSOCIATED WITH A DRIVING BEHAVIOR OF THE VEHICLE FROM AMONG MULTIPLE CONTROL STRATEGIES, BASED AT LEAST ON THE LIKELIHOOD

- PROVIDING INSTRUCTIONS TO CONTROL THE VEHICLE BASED ON THE DETERMINED CONTROL STRATEGY

| COMPUTER READABLE MEDIUM 503 | COMPUTER RECORDABLE MEDIUM 504 | COMMUNICATIONS MEDIUM 505 |

FIGURE 5

CONTROL OF VEHICLES BASED ON AUDITORY SIGNALS

CROSS REFERENCE TO RELATED APPLICATION

The present application is a continuation of U.S. patent application Ser. No. 13/442,303, filed on Apr. 9, 2012, and entitled "Control of Vehicles based on Auditory Signals," which is herein incorporated by reference as if fully set forth in this description.

BACKGROUND

Autonomous vehicles use various computing systems to aid in transporting passengers from one location to another. Some autonomous vehicles may require some initial input or continuous input from an operator, such as a pilot, driver, or passenger. Other systems, for example an autopilot system, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to control of vehicles based on auditory signals. In one aspect, a method is described. The method may comprise receiving, at a computing device that is in communication with a vehicle, audio information relating to an audible crosswalk signal for an intersection that the vehicle is approaching. The method may also comprise determining a likelihood associated with a presence of a pedestrian in a crosswalk of the intersection, based on the audio information. The method may further comprise determining a control strategy associated with a driving behavior of the vehicle from among multiple control strategies, based at least on the likelihood. The method also may comprise providing instructions to control the vehicle based on the determined control strategy.

In another aspect, a system is described. The system may comprise one or more sensors. The system may also comprise a computing device configured to control a vehicle. The computing device may be coupled to the one or more sensors. The computing device may be configured to receive, from the one or more sensors, audio information relating to an audible crosswalk signal for an intersection that the vehicle is approaching. The computing device may also be configured to determine a likelihood associated with a presence of a pedestrian in a crosswalk of the intersection, based on the audio information. The computing device may further be configured to determine a control strategy associated with a driving behavior of the vehicle from among multiple control strategies, based at least on the likelihood. The computing device may also be configured to provide instructions to control the vehicle based on the determined control strategy.

In still another aspect, a non-transitory computer readable medium having stored thereon instructions executable by a computing device of a vehicle to cause the computing device to perform functions is described. The functions may comprise receiving audio information relating to an audible crosswalk signal for an intersection that the vehicle is approaching. The functions may also comprise determining a likelihood associated with a presence of a pedestrian in a crosswalk of the intersection, based on the audio information. The functions may further comprise determining a control strategy associated with a driving behavior of the vehicle from among multiple control strategies, based at least on the likelihood. The functions may also comprise providing instructions to control the vehicle based on the determined control strategy.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic illustrating a conceptual partial view of a computer program, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to control a vehicle or may be in communication with the vehicle. The computing device may be configured to receive audio information relating to an audible crosswalk signal for an intersection that the vehicle is approaching. The computing device also may be configured to determine a likelihood associated with a presence of a pedestrian in a crosswalk at the intersection, based on the audio information. The computing device further may be configured to determine a control strategy associated with a driving behavior of the vehicle from among multiple control strategies, based on the likelihood and further may be configured to provide instructions to control the vehicle based on the determined control strategy.

An example vehicle control system may be implemented in or may take a form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Figure 1:
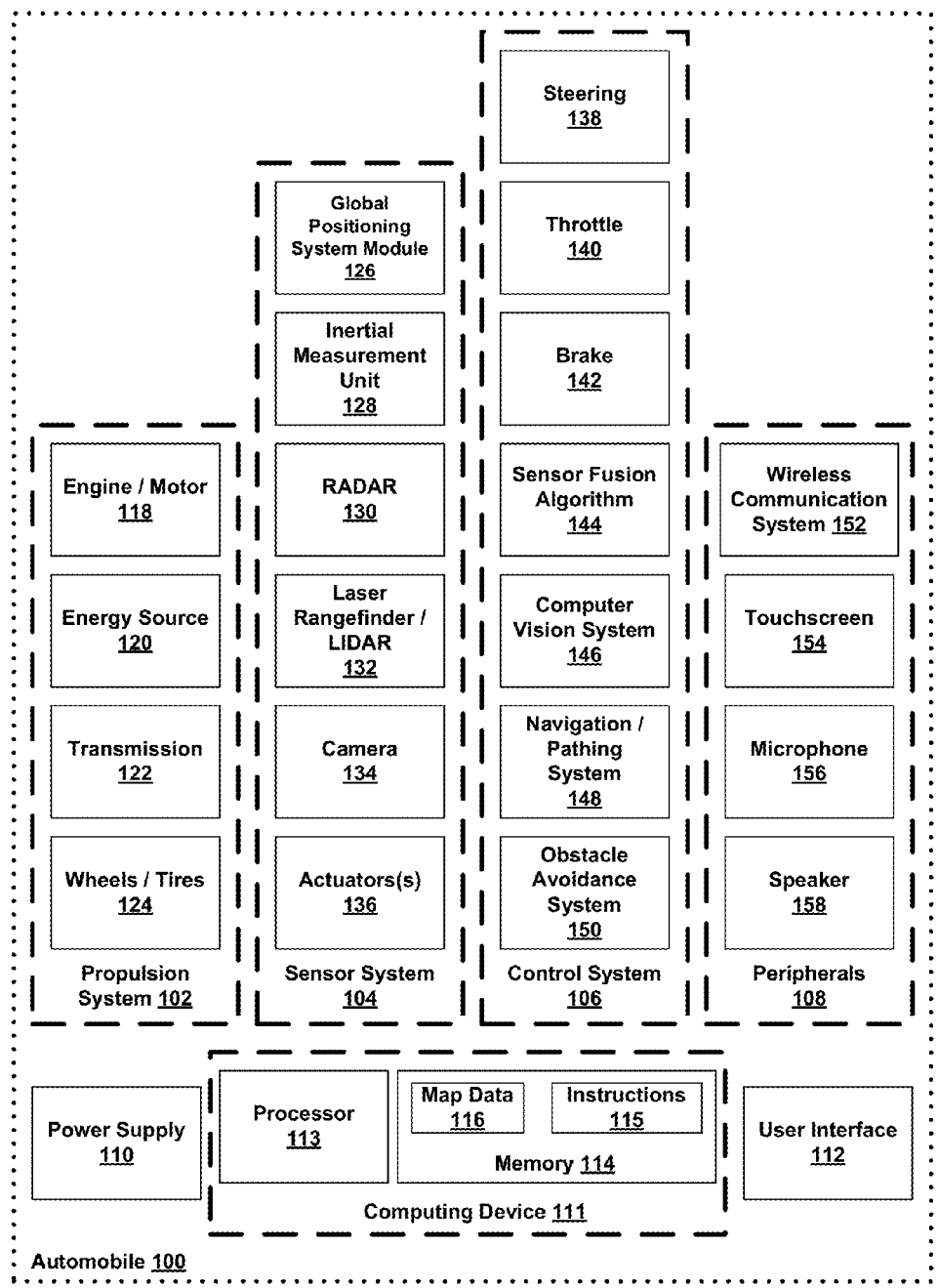
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of the automobile 100 could be configured in various formats, including a unicycle, bicycle/motorcycle, tricycle, or car/truck four-wheel format. Other wheel/tire formats are possible as well, such as those including six or more wheels. The wheels/tires 124 of the automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors of the sensor system 104. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR 130 unit may be any sensor configured to sense objects in the environment in which the automobile 100 is located using radio signals. In some examples, in addition to sensing the objects, the RADAR unit 130 may additionally be configured to sense the speed and/or direction of motion of the objects.

Similarly, the laser rangefinder or LIDAR unit 132 may be any sensor configured to sense objects in the environment in which the automobile 100 is located using lasers. In particular, the laser rangefinder or LIDAR unit 132 may include a laser source and/or laser scanner configured to emit a laser and a detector configured to detect reflections of the laser. The laser rangefinder or LIDAR 132 may be configured to operate in a coherent (e.g., using heterodyne detection) or an incoherent detection mode, for example.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light, or x-rays. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may determine the distance to the points on the object. The predetermined light pattern may comprise infrared light, or light of another wavelength.

As another example, the camera 134 may use a laser scanning technique in which the automobile 100 emits a laser and scans across a number of points on an object in the environment. While scanning the object, the automobile 100 uses the camera 134 to detect a reflection of the laser off the object for each point. Based on a length of time it takes the laser to reflect off the object at each point, the automobile 100 may determine the distance to the points on the object.

As yet another example, the camera 134 may use a time-of-flight technique in which the automobile 100 emits a light pulse and uses the camera 134 to detect a reflection of the light pulse off an object at a number of points on the object. In particular, the camera 134 may include a number of pixels, and each pixel may detect the reflection of the light pulse from a point on the object. Based on a length of time it takes the light pulse to reflect off the object at each point, the automobile 100 may determine the distance to the points on the object. The light pulse may be a laser pulse, for example. Other range detecting techniques are possible as well, including stereo triangulation, sheet-of-light triangulation, interferometry, and coded aperture techniques, among others. The camera 134 may take other forms as well.

In some examples, the camera 134 may include a movable mount and/or an actuator that are configured to adjust the position and/or orientation of the camera 134 by moving the camera 134 and/or the movable mount.

The actuators 136 may, for example, be configured to modify a position and/or orientation of the sensors.

The sensor system 104 may additionally or alternatively include components other than those shown.

The control system 106 may be configured to control operation of the automobile 100 and components of the automobile 100. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust a heading or direction of the automobile 100.

The throttle 140 may be any combination of mechanisms configured to control an operating speed and acceleration of the engine/motor 118 and, in turn, a speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 may further be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and the map data 116 so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100. In an example, the computing device 111 may be configured to receive from the microphone 156 an audio signal associated with a sound emitted by an audible crosswalk signal at an intersection that the automobile 100 may be approaching.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors. To the extent the processor 113 includes more than one processor; such processors could work separately or in combination.

The computing device 111 may be configured to control functions of the automobile 100 based on input received through the user interface 112, for example.

The memory 114 may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
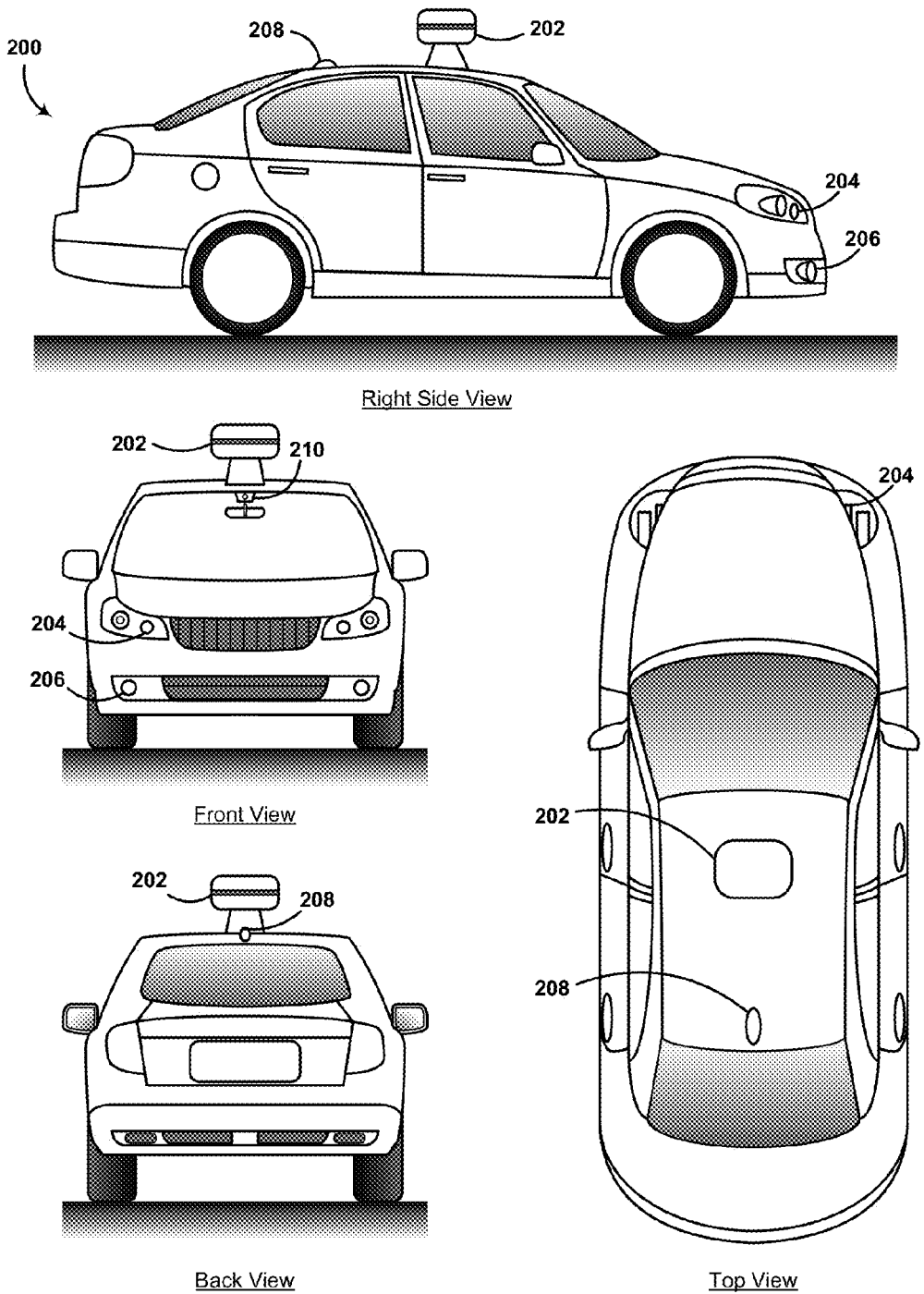
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include other components in addition to or instead of those shown.

A control system of the automobile 200 may be configured to control the automobile 200 in accordance with a given control strategy from among multiple possible control strategies. The control system may be configured to receive information from sensors coupled to the automobile 200 (on or off the automobile 200), determine a control strategy based on the information, and provide instructions to control the automobile 200 based on the determined control strategy. The control system further may be configured to continuously monitor the information received from the sensors to continuously evaluate driving conditions and also may be configured to modify the control strategy or determine another control strategy based on changes in the driving conditions.

Figure 3:
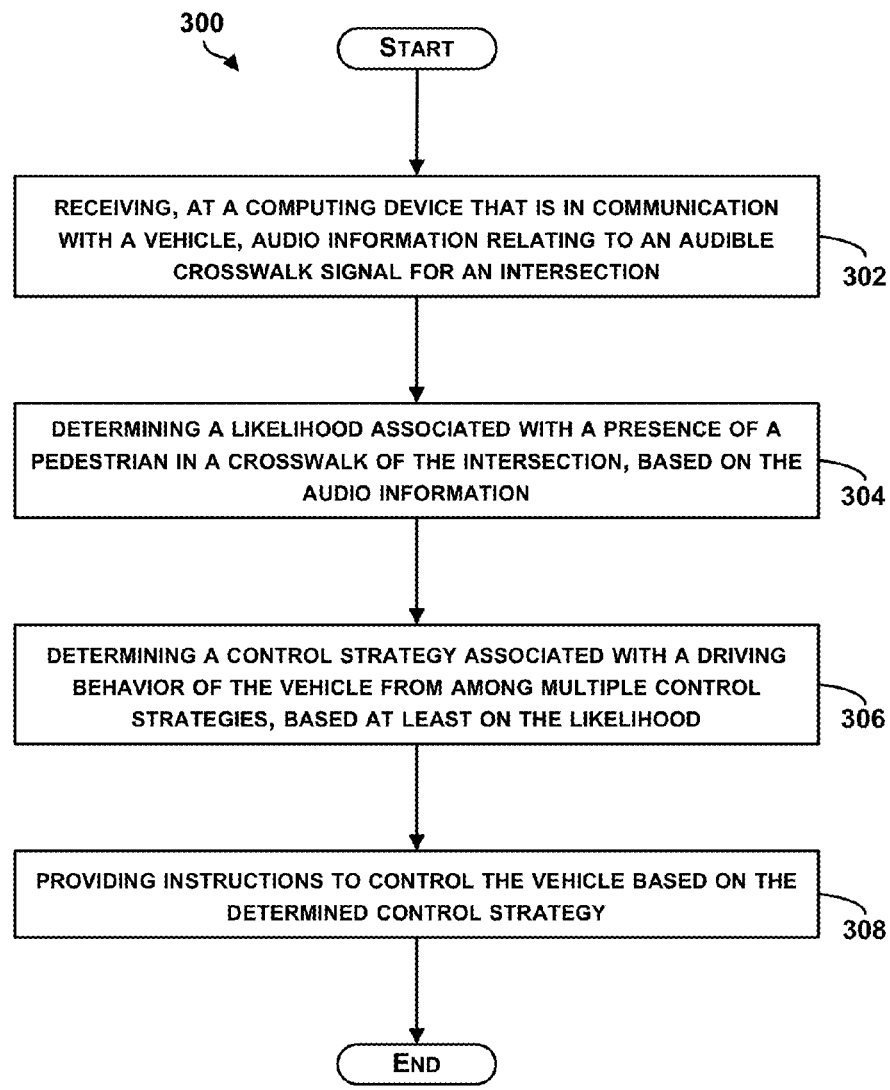
FIG. 3 is a flow chart of an example method for control of vehicles based on auditory signals, in accordance with an example embodiment.

FIG. 3 is a flow chart of an example method for control of vehicles based on auditory signals, in accordance with an example embodiment.

The method 300 may include one or more operations, functions, or actions as illustrated by one or more of blocks 302, 304, 306, and 308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device that is in communication with a vehicle, audio information relating to an audible crosswalk signal for an intersection. The vehicle may be approaching or proximal to the intersection such that the vehicle may be within a distance at which the vehicle can receive audio information from the audible crosswalk signal, or in some examples the intersection may be within an estimated driving path of the vehicle and the audio information can be provided to the vehicle by other means (e.g., provided via wireless network communication, etc.). The computing device may be onboard the vehicle or may be off-board and in wireless communication with the vehicle, for example. In an example, the computing device may be configured to control the vehicle in an autonomous or semi-autonomous operation mode. The computing device may be configured to receive, from sensors coupled to the vehicle, information associated with, for example, condition of systems and subsystems of the vehicle, driving condition, road condition, etc. For example, the computing device may be configured to receive, from an audio sensor or a microphone, audio information relating to an audible crosswalk signal at an intersection that the vehicle is approaching. The audio information, for example, may include an audio signal associated with a sound emitted by the audible crosswalk signal and received at a microphone coupled to the vehicle and in communication with the computing device.

In an example, the audible crosswalk signal may be manually actuated by a pedestrian attempting to cross the intersection. In another example, the audible crosswalk signal may be wired in parallel with an associated traffic signal light such that when the associated traffic signal light turns green, for example, the audible crosswalk signal may be configured to substantially simultaneously emit a sound associated with an allowed direction of pedestrian crossing.

In examples, the audible crosswalk signals may be present at a subset of intersections (not all intersections). In these examples, the computing device may be configured to receive, from a GPS sensor or module coupled to the vehicle, information relating to a geographic location of the vehicle and the intersection that the vehicle is approaching, and further determine, based on the information, that the audible crosswalk signal is present at the intersection, and accordingly may be configured to enable the audio sensor to receive the audio information emitted by the audible crosswalk signal.

The audible crosswalk signal may be configured to emit a sound indicative of or meaningful to pedestrian crossing control at the intersection. The audio signal received at the computing device may have properties corresponding to properties of the emitted sound such as loudness, directionality, frequency spectrum, sound pressure level, and temporal characteristics that may provide information associated with a state of the audible crosswalk signal. For example, the properties of the audio signal may provide information relating to an allowed direction of travel for a pedestrian (e.g., north-south or east-west) and an amount of time remaining before the state of the audible crosswalk signal may change. In another example, the properties of the audio signal also may provide information associated with a given state of an associated traffic signal at the intersection (e.g., green, yellow, or red light) and also a given amount of time remaining before the given state of the traffic light may change.

Figure 4A:
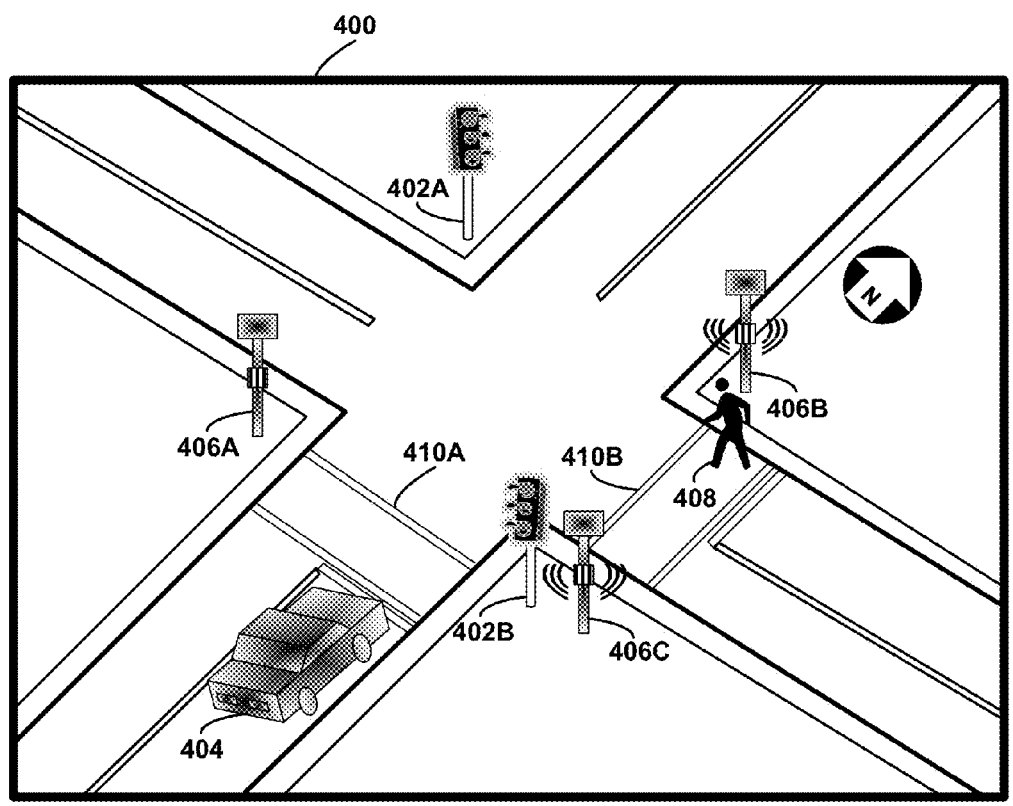
FIG. 4A illustrates an example intersection with audible crosswalk signals, in accordance with an example embodiment.

FIG. 4A illustrates an example intersection 400 with audible crosswalk signals, in accordance with an example embodiment. The intersection 400 may be a four-way intersection, for example. The intersection 400 may include traffic lights 402A-B that may provide information meaningful to traffic control of vehicles such as automobile 404, and may include audible crosswalk signals 406A-C that may provide information meaningful to pedestrian 408, crossing control at crossings 410A-B, for example. Although two traffic lights 402A-B and three audible crosswalk signals 406A-C are shown, a given four-way intersection such as the intersection 400 may include eight traffic lights and eight audible crosswalk signals providing information relating to traffic control and pedestrian crossing control in all possible directions at the intersection 400.

Referring back to FIG. 3, at block 304, the method 300 includes determining a likelihood associated with a presence of a pedestrian in a crosswalk of the intersection, based on the audio information. In example, the computing device may be configured to analyze the audio signal and determine properties of the audio signal such as frequency, amplitude, etc. Based on the determined properties, the computing device may be configured to determine the state of the audible crosswalk signal.

As an example, the audible crosswalk signal may emit a long "cuckoo" sound when a north-south walking direction is allowed and may emit a short "chirp" sound when an east-west walking direction of travel is allowed. The computing device may be configured to determine a type of sound (e.g., a cuckoo or chirp) by analyzing the audio signal associated with the sound. As an example, the cuckoo sound may be composed of two frequencies that are combined to produce the cuckoo sound that may be repeated a given number of times (e.g., four times) during a given period of time in which the north-south walking direction is allowed. The chirp sound may be composed of a single continuous signal at a frequency that produces the chirp sound that may be repeated a respective number of times (e.g., seven times) during a respective period of time in which the east-west walking direction is allowed. The two types of sound may also differ in a level of sound pressure, for example. The level of sound pressure of both types may also be adjusted to be higher than any background noise at the intersection (e.g., traffic noise due to a truck passing by). The computing device may be configured to determine the type of sound by analyzing and determining properties of the audio signal associated with the sound and thus may be configured to determine the allowed walking direction, for example.

In an example, when walking at an intersection is not allowed, the audible crosswalk signal may not emit any sound. Therefore, based on the determined properties of the audio signal, the computing device may be configured to determine the allowed walking direction or may be configured to determine that walking in the intersection is not allowed at a given point in time.

In examples, the properties of the audio signal also may be indicative of an amount of time remaining before a change in the state of the audible crosswalk signal may occur. For example, a frequency or sound pressure level of a given type of sound may progressively change as a remaining amount of time before the state of the audible crosswalk may change decreases.

In some examples, there may be a correlation of a state of a traffic signal and the state of a corresponding audible crosswalk signal. For example, the cuckoo signal indicating an allowable north-south walking direction may be indicative of a green light at the intersection in the north-south travel direction. Therefore, in these examples, the computing device may be configured to infer the state of the traffic signal based on the audio signal. Also, the computing device may be configured to determine a respective amount of time remaining before the state of the traffic signal changes (e.g., from green to yellow).

The computing device may be configured to determine a likelihood that a pedestrian may be crossing the intersection, based on determining one or more of variables including (i) a state of audible crosswalk signal, (ii) an amount of time remaining before the state of the audible crosswalk signal may change, (iii) a respective state of a traffic light at the intersection, and (iv) a respective amount of time remaining before the respective state of the traffic light may change. The computing device may be configured to determine the one or more variables, based on the audio information, or lack thereof, emitted by the audible crosswalk signals at the intersection.

The computing device further may be configured, for example, to use a probability model (e.g., a Gaussian distribution) to model or describe the likelihood that a pedestrian may be crossing the intersection in a given direction. Further, the computing device may be configured to determine or assign the likelihood based on parameters of the probability model. The likelihood can be qualitative such as "high" or may be numerical such as a number on a scale, for example.

In examples, the computing device may be configured to determine the likelihood based on other inputs from other sensors on or off the vehicle. For example, the computing device may receive information associated with an image captured by a camera coupled to the vehicle that may depict a pedestrian crossing the intersection. Other sensors and examples of determining the likelihood are possible. In some examples, the computing device may be configured to use the other inputs as well as the audio information to determine the likelihood. In other examples, other sensors may not be able to provide information associated with detecting the pedestrian (e.g., the pedestrian is hidden behind a traffic light pole and the image captured by the camera may not depict the pedestrian) and the computing device may be configured to determine the likelihood based on the audio information emitted by the audible crosswalk signal. In still another example, the computing device may be configured to determine the likelihood based on the audio information, and when the likelihood exceeds a given threshold, the computing device may be configured to enable one or more sensors to capture and provide more information associated with a probability that a pedestrian may be present at or crossing the intersection (e.g., a camera of the vehicle). Other examples are possible.

At block 306, the method 300 includes determining a control strategy associated with a driving behavior of the vehicle from among multiple control strategies, based at least on the likelihood. The computing device may be configured to determine a control strategy associated with a driving behavior based on the determined likelihood that a pedestrian may be at or is crossing the intersection.

The control system of the vehicle may comprise multiple control strategies that may be predetermined or adaptive to changes in a driving environment of the vehicle. Generally, a control strategy associated with a given driving behavior may comprise sets of rules associated with traffic interaction in various driving contexts such as intersection crossing. The control strategy, for example, may comprise rules that determine a speed of the vehicle and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, the likelihood that the pedestrian may be crossing the intersection, and avoiding areas that may result in unsafe behavior such as oncoming-traffic lanes, etc.). For instance, in an intersection crossing situation, the computing device may be configured to determine, based on the determined likelihood, a control strategy comprising rules for actions that control speed and lane of the vehicle to safely maintain a distance with other objects (including pedestrians) and select a trajectory that is considered safest.

In an example, a first control strategy may comprise a default driving behavior and a second control strategy may comprise a defensive driving behavior. Characteristics of a the defensive driving behavior may comprise, for example, following another vehicle, maintaining a predetermined safe distance with other vehicles or pedestrians that may be larger than a distance maintained in the default driving behavior, turning-on lights, reducing a speed of the vehicle, and stopping the vehicle. In this example, the computing device may be configured to compare the determined likelihood to a threshold likelihood, and may be configured to determine or select the first or the second control strategy, based on the comparison. For example, if the determined likelihood is greater than the threshold likelihood, the computing device may be configured to determine the second control strategy (e.g., select the defensive driving behavior). If the determined likelihood is less than the threshold likelihood, the computing device may be configured to determine the first control strategy (e.g., select the default driving behavior).

In another example, alternatively or in addition to transition between discrete control strategies (e.g., the first control strategy and the second control strategy) the computing device may be configured to select from a continuum of driving modes or states based on the determined likelihood. In still another example, the computing device may be configured to determine a discrete control strategy and also may be configured to select a driving mode from a continuum of driving modes within the determined discrete control strategy. In this example, a given control strategy may comprise multiple sets of driving rules, where a set of driving rules describe actions for control of speed and direction of the vehicle. The computing device further may be configured to cause a smooth transition from a given set of driving rules to another set of driving rules of the multiple sets of driving rules, based on the determined likelihood. A smooth transition may indicate that the transition from the given set of rules to another may not be perceived by a passenger in the vehicle as a sudden or jerky change in a speed or direction of the vehicle, for example.

In an example, a given control strategy may comprise a program or computer instructions that characterize actuators controlling the vehicle (e.g., throttle, steering gear, brake, accelerator, or transmission shifter) based on the determined likelihood. The given control strategy may include action sets ranked by priority, and the action sets may include alternative actions that the vehicle may be configured to take to accomplish a task (e.g., driving from one location to another). The alternative actions may be ranked based on the determined likelihood, for example. In this example, the computing device may be configured to select an action to be performed and, optionally, modified based on the determined likelihood.

In another example, multiple control strategies (e.g., programs) may continuously propose actions to the computing device. The computing device may be configured to decide which strategy may be determined based on a weighted set of goals (safety, speed, etc.), for example. In this example, weights of the weighted set of goals may be a function of the determined likelihood. Based on an evaluation of the weighted set of goals, the computing device, for example, may be configured to rank the multiple control strategies and respective action sets and determine a given control strategy and a respective action set based on the ranking.

As an example, assuming a high likelihood that a pedestrian may be crossing the intersection, the computing device may be configured to determine a control strategy that comprises actions effective to cause the vehicle to: (i) reduce the speed of or stop the vehicle, (ii) approach intersection slowly while maintaining safe distances with respect to objects (including the pedestrian), and (iii) reach a target (e.g., cross intersection or make a turn at the intersection) at a desired lane and at a desired speed. Other examples are provided for illustration in table 1 below.

TABLE 1

| Information Received | Likelihood of presence of pedestrian in crosswalk | Control strategy for driving behavior |
| --- | --- | --- |
| Long chirp audio signal | 80% | Reduce speed of vehicle as vehicle approaches intersection. Stop vehicle prior to reaching crosswalk. |
| A cuckoo sound with a frequency or sound pressure level progressively changing indicating a state change may be imminent. | 10% | Reduce speed of vehicle as vehicle approaches intersection. Enable sensor(s) to provide information confirming that pedestrians cleared intersection. Based on the information slowly proceed to make a right turn at the intersection or stop. |
| No Sound | Low | Reduce speed of vehicle as vehicle approaches intersection. Enable sensors to confirm that there are no pedestrians. Slowly make a right turn at the intersection. |

These examples and driving situations are for illustration only. Other examples and control strategies are possible as well.

At block 308, the method 300 includes providing instructions to control the vehicle based on the determined control strategy. In an example, the computing device may be configured to provide instructions comprising an action set or rule set associated with the determined control strategy to that may be executed to control actuators of the vehicle. For instance, the computing device may be configured to provide program instructions (e.g., stored in a memory of the computing device) to adjust translational velocity, or rotational velocity, or both, of the vehicle, based on the determine control strategy.

As an example, providing instructions to control the vehicle may comprise determining a desired path of the vehicle, based on the likelihood and the determined control strategy. In one example, the determined control strategy associated with a given driving behavior of the vehicle may comprise driving the vehicle cautiously and slowly due to a high likelihood of the presence of the pedestrian. In another example, the computing device may be configured to stop the vehicle when the likelihood is greater than a threshold likelihood.

Figure 4B:
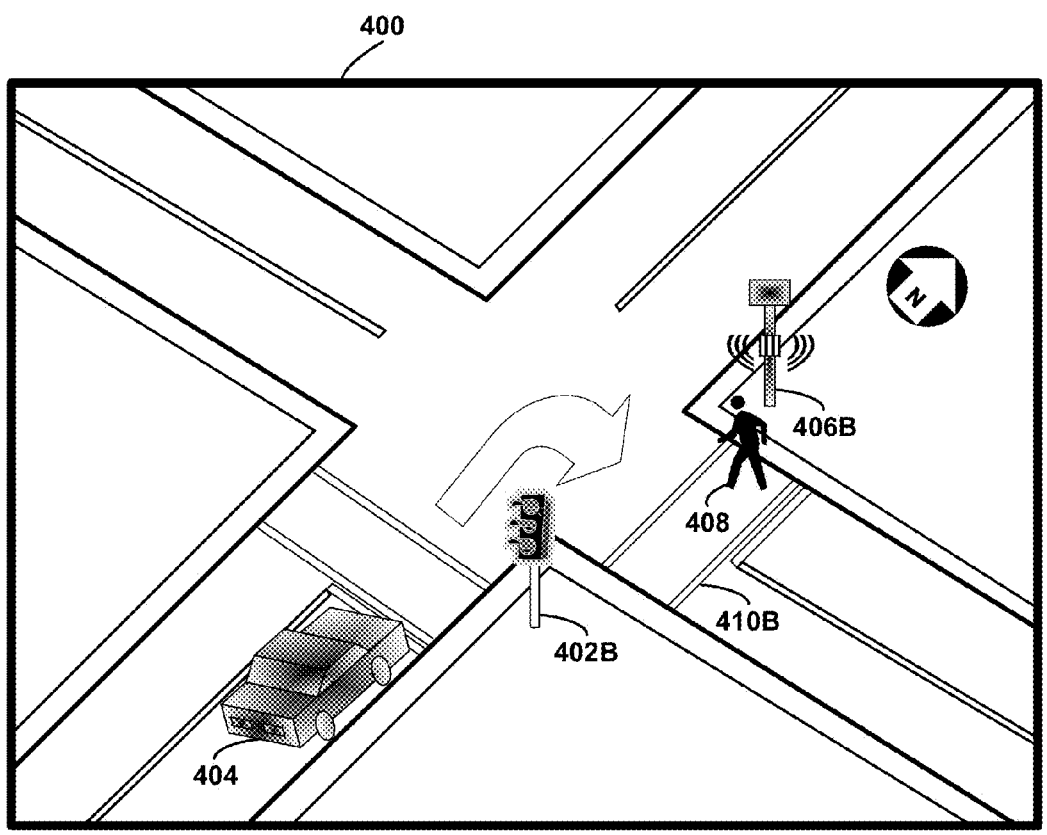
FIG. 4B illustrates the example intersection with a pedestrian crossing at the intersection, in accordance with an example embodiment.

FIG. 4B illustrates the example intersection 400 with the pedestrian 408 crossing at the intersection 400, in accordance with an example embodiment. In FIG. 4B, the automobile 404 may be approaching the intersection 400 where the traffic light 402B has a green light state. The computing device configured to control the automobile 404 may be configured to determine a desired path for the automobile 404 that comprises turning right at the intersection 400. As an example, the pedestrian 408 may be blocked from being detected by other sensors (e.g., a camera) on the automobile 404, because, for instance, the pedestrian 408 is hidden behind a pole of the traffic light 402B from a field of view of the camera. The computing device may be configured to receive audio information (e.g., an audio signal) from an audio sensor on the automobile 404 that is configured to receive a sound emitted by the audible crosswalk signal 406B. The computing device may be configured, based on the audio information, to determine a likelihood that the pedestrian 408 may be present at the intersection 400 and may intend to step off an associated curb and proceed through the crosswalk 410B. Accordingly, the computing device may be configured to determine a control strategy and associated action or rule set and may be configured to provide instructions to control the automobile 404 such that the automobile 404 may proceed slowly with caution and allow a given amount of time to pass before turning to ensure that the pedestrian 408 has cleared the crosswalk 410B, for example.

In an example, the computing device may be configured to enable other sensors, based on the determined likelihood, to provide more information about location of the pedestrian 408 with respect to the crosswalk 410B and whether the pedestrian 408 has cleared the crosswalk 410B or not.

Figure 4C:
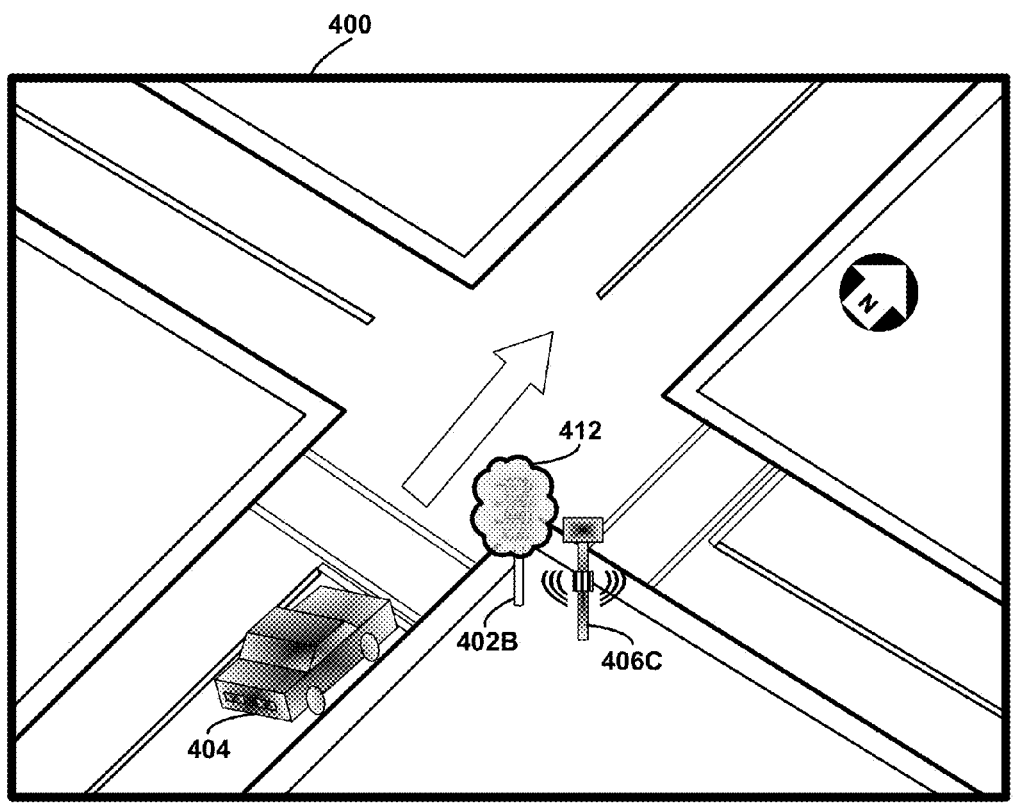
FIG. 4C illustrates the example intersection with an obscured traffic light, in accordance with an example embodiment.

FIG. 4C illustrates the example intersection 400 with an obscured traffic light 402B, in accordance with an example embodiment. In FIG. 4C, the automobile 404 is approaching the intersection 400 while an obscurity 412 may prevent the automobile 404 from detecting a state of the traffic light 402B (e.g., weather conditions, faulty signal, etc.). The computing device configured to control the automobile 404 may be configured to receive the audio information from the audible crosswalk signal 406C at the intersection 400 and may be configured, based on the audio information, to determine that the north-south direction is open (i.e., the traffic light 402B has a green light state) and may be configured to provide program instructions to control the automobile 404 to proceed through the intersection 400.

As another example, in FIG. 4C, the automobile 404 may be approaching the intersection 400 with the traffic light 402B having a green light state but may not have information associated with how much longer the traffic light 402B will remain in the green light state. Based on the audio information associated with the audible crosswalk signal 406C, the computing device may be configured to determine an amount of time remaining until a change in the green light state of the traffic light 402B may occur (e.g., change from the green light state to yellow or red light state) and may be configured to provide instructions to control the automobile 404 (e.g., change driving parameters associated with speed and direction) accordingly to avoid driving unsafely though the intersection 400, for example.

These control actions and driving situations are for illustration only. Other example situations are possible as well.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors may provide functionality or portions of the functionality described above with respect to FIGS. 1-4. Thus, for example, referring to the embodiments shown in FIG. 3, one or more features of blocks 302-308 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device 111 of FIG. 1 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving, at a computing device of a vehicle, audio information relating to an audible crosswalk signal for an intersection;
   determining, based on the audio information, a state of a traffic signal at the intersection;
   determining a control strategy associated with a driving behavior of the vehicle from among multiple control strategies based at least on the state of the traffic signal; and
   providing instructions to control the vehicle based on the determined control strategy.

2. The method of claim 1, wherein the computing device is configured to control the vehicle in an autonomous operation mode.

3. The method of claim 1, wherein determining the state of the traffic signal at the intersection comprises:
   determining a state of the audible crosswalk signal based on the audio information, wherein the state of the audible crosswalk signal provides information meaningful to pedestrian crossing control.

4. The method of claim 3, wherein determining the state of the traffic signal at the intersection comprises:
   determining an estimate of an amount of time remaining before the state of audible crosswalk signal changes.

5. The method of claim 4, wherein determining the state of the audible crosswalk signal and the estimate of the amount of time remaining before the state of the audible crosswalk signal changes comprises:
   determining one or more of frequency and amplitude of an audio signal associated with the audio information.

6. The method of claim 1, further comprising:
   determining an allowed direction of travel of a given pedestrian based on the audio information, wherein determining the control strategy is further based on the allowed direction of travel of the given pedestrian.

7. The method of claim 1, wherein providing the instructions to control the vehicle based on the determined control strategy comprises:
   determining a desired path of the vehicle based at least in part on the state of the traffic signal.

8. The method of claim 1, further comprising:
   determining an estimate of an amount of time remaining before the state of the traffic signal at the intersection changes, wherein determining the control strategy is further based on the estimate of the amount of time.

9. A system, comprising:
   one or more sensors coupled to a vehicle;
   at least one processor in communication with the one or more sensors; and data storage comprising instructions that, when executed by the at least one processor, cause the system to perform functions comprising:
- receiving, from the one or more sensors, audio information relating to an audible crosswalk signal for an intersection;
- determining, based on the audio information, a state of a traffic signal at the intersection;
- determining a control strategy associated with a driving behavior of the vehicle from among multiple control strategies based at least on the state of the traffic signal; and
- providing instructions to control the vehicle based on the determined control strategy.

10. The system of claim 9, wherein the one or more sensors include an audio sensor, and wherein the function of receiving the audio information comprises:
- receiving from the audio sensor an audio signal associated with the audio information.

11. The system of claim 10, wherein the function of determining the state of the traffic signal at the intersection comprises:
- determining one or more of frequency and amplitude of the audio signal; and
- determining a state of the audible crosswalk signal based on the one or more of the frequency and the amplitude of the audio signal.

12. The system of claim 9, wherein the determined control strategy comprises a defensive driving behavior comprising at least one of: (i) providing an alert to a driver of the vehicle, (ii) slowing a speed of the vehicle, and (iii) stopping the vehicle.

13. The system of claim 9, wherein the one or more sensors include a Global Position System (GPS) sensor and an audio sensor, and wherein the functions further comprise:
- receiving, from the GPS sensor, location information associated with a geographic location of the vehicle and the intersection the vehicle is approaching;
- determining that the audible crosswalk signal is present at the intersection based on the location information; and
- enabling the audio sensor so as to receive the audio information relating to the audible crosswalk signal.

14. The system of claim 9, wherein the functions further comprise:
- enabling a sensor of the one or more sensors based on the determined state of the traffic signal at the intersection.

15. A non-transitory computer readable medium having stored thereon instructions that, when executed by a computing device of a vehicle, cause the computing device to perform functions comprising:
- receiving audio information relating to an audible crosswalk signal for an intersection;
- determining, based on the audio information, a state of a traffic signal at the intersection;
- determining a control strategy associated with a driving behavior of the vehicle from among multiple control strategies based at least on the state of the traffic signal; and
- providing instructions to control the vehicle based on the determined control strategy.

16. The non-transitory computer readable medium of claim 15, wherein the computing device is configured to control the vehicle in an autonomous operation mode.

17. The non-transitory computer readable medium of claim 15, wherein the function of receiving the audio information comprises receiving an audio signal associated with the audio information, and wherein the function of determining the state of the traffic signal at the intersection comprises:
- determining one or more of frequency and amplitude of the audio signal; and
- determining a state of the audible crosswalk signal based on the one or more of the frequency and the amplitude of the audio signal.

18. The non-transitory computer readable medium of claim 15, wherein the functions further comprise:
- determining an estimate of an amount of time remaining before the state of the traffic signal at the intersection changes, wherein the function of determining the control strategy comprises determining the control strategy further based on the estimate of the amount of time.

19. The non-transitory computer readable medium of claim 15, wherein the functions further comprise:
- determining a likelihood associated with a presence of a pedestrian in a crosswalk of the intersection based on the audio information, wherein the function of determining the control strategy comprises determining the control strategy further based on the likelihood.

20. The non-transitory computer readable medium of claim 15, wherein the functions further comprise:
- determining a state of the audible crosswalk signal based on the audio information, wherein the function of determining the state of the traffic signal at the intersection comprises determining the state of the traffic signal based on the state of the audible crosswalk signal.

* * * * *